(12) United States Patent
Smith

(10) Patent No.: US 9,290,082 B1
(45) Date of Patent: Mar. 22, 2016

(54) SUN SHADE SYSTEMS

(71) Applicant: Stanley A. Smith, Huntington Beach, CA (US)

(72) Inventor: Stanley A. Smith, Huntington Beach, CA (US)

(*) Notice: Subject to any disclaimer, the term of this patent is extended or adjusted under 35 U.S.C. 154(b) by 0 days.

(21) Appl. No.: 14/470,060

(22) Filed: Aug. 27, 2014

Related U.S. Application Data

(60) Provisional application No. 61/872,610, filed on Aug. 30, 2013.

(51) Int. Cl.
*B60J 3/02* (2006.01)

(52) U.S. Cl.
CPC .................... *B60J 3/0286* (2013.01)

(58) Field of Classification Search
CPC ................ B60J 3/0286; B60J 3/007
USPC .............. 296/97.6, 97.1, 97.2, 97.8
See application file for complete search history.

(56) References Cited

U.S. PATENT DOCUMENTS

| | | | | |
|---|---|---|---|---|
| 3,511,365 A | * | 5/1970 | Dow | 206/390 |
| 4,749,222 A | * | 6/1988 | Idland | 296/152 |
| 4,862,944 A | | 9/1989 | Hendershot | |
| 5,829,507 A | * | 11/1998 | Pawlowski | 160/368.1 |
| 6,345,857 B1 | * | 2/2002 | Leary | 296/97.7 |

* cited by examiner

*Primary Examiner* — Jason S Morrow
*Assistant Examiner* — E Turner Hicks
(74) *Attorney, Agent, or Firm* — RG Patent Consulting, LLC; Rachel Gilboy

(57) ABSTRACT

A self-adhering sun shield fixedly-coupleable to a windshield of a vehicle system includes a self-adhering sun shield assembly having a first self-adhering sun shield removable sticker, a second self-adhering sun shield removable sticker; and a third self-adhering sun shield removable sticker. The self-adhering sun shield fixedly-coupleable to a windshield of a vehicle system includes the self-adhering sun shield assembly. The self-adhering sun shield assembly is self-adhering to the windshield via static electricity. The first self-adhering sun shield removable sticker, the second self-adhering sun shield removable sticker, and the third self-adhering sun shield removable sticker form self-adhering sun shield assembly when removably-adhered to the windshield to prevent sun glare when in an in-use condition.

18 Claims, 5 Drawing Sheets

SUN SHADE SYSTEMS

CROSS-REFERENCE TO RELATED APPLICATION

The present application is related to and claims priority from prior provisional application Ser. No. 61/872,610, filed Aug. 30, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates to sun protection in vehicles and more specifically relates to a self-adhering sun shield fixedly-coupleable to a windshield of a vehicle system.

2. Description of the Related Art

There are more than 205 million passenger motor vehicles on America's roads and highways; virtually all of which have an inefficiency that can seriously diminish the driver's view of the road. The windshields in our cars are meant to give us a full view of the road. Typically, windshields are tinted along the top border; and the interior of the vehicle is equipped with sun-visors to further block the glare of the sun. The trouble is that neither the tinted border nor the visors provide sufficient blocking of the sun's glare in the upper corners and upper middle section between the first visor (driver's side) and second visor (passenger side) when the sun is low in the sky and this defect can have the most serious consequences for a driver's view, and thus for safety. This is not desirable.

Various attempts have been made to solve problems found in shade device art. Among these are found in: U.S. Pat. No. 3,511,365 to Walter K. Dow et al; U.S. Pat. No. 5,829,507 to Mark Pawlowski; and U.S. Pat. No. 4,862,944 to Michael C. Hendershot. This prior art is representative of shades for sun protection in vehicles. None of the above inventions and patents, taken either singly or in combination, is seen to describe the invention as claimed.

Ideally, a self-adhering sun shield fixedly-coupleable to a windshield of a vehicle system should be user-friendly and safe in-use and, yet may operate reliably and be manufactured at a modest expense. Thus, a need exists for a self-adhering sun shield fixedly-coupleable to a windshield of a vehicle system (Sun Shade Systems) to provide coverage of a windshield which is not shielded from direct sunlight by factory tinting of the windshield glass and glare prevented by a first sun visor or a second sun visor and to avoid the above-mentioned problems.

BRIEF SUMMARY OF THE INVENTION

In view of the foregoing disadvantages inherent in the known sun protection in vehicles device art, the present invention provides a novel self-adhering sun shield fixedly-coupleable to a windshield of a vehicle system (also referred to herein as Sun Shade Systems). The general purpose of the present invention, which will be described subsequently in greater detail is to provide a self-adhering sun shield fixedly-coupleable to a windshield of a vehicle system (Sun Shade Systems).

A self-adhering sun shield fixedly-coupleable to a windshield of a vehicle system is disclosed herein in a preferred embodiment comprising: a self-adhering sun shield assembly having a first self-adhering sun shield removable sticker, a second self-adhering sun shield removable sticker; and a third self-adhering sun shield removable sticker. The self-adhering sun shield fixedly-coupleable to a windshield of a vehicle system comprises the self-adhering sun shield assembly. The self-adhering sun shield assembly is self-adhering to the windshield via static electricity. The first self-adhering sun shield removable sticker, the second self-adhering sun shield removable sticker, and the third self-adhering sun shield removable sticker form self-adhering sun shield assembly when removably-adhered to the windshield to prevent sun glare when in an in-use condition. The first self-adhering sun shield removable sticker, the second self-adhering sun shield removable sticker, and the third self-adhering sun shield removable sticker with its respective flat, durable backing sheet protects each individual sticker during storage and shipping.

The first self-adhering sun shield removable sticker, the second self-adhering sun shield removable sticker, and the third self-adhering sun shield removable sticker are tinted to reduce light intensity (glare) when passing through the self-adhering sun shield assembly while maintaining sufficient optimal visibility through rest of windshield. The first self-adhering sun shield removable sticker, the second self-adhering sun shield removable sticker, and the third self-adhering sun shield removable sticker are comprised of a thin, lightweight film and are semi-transparent to help permit an unobstructed view through the windshield. The lightweight film comprises vinyl and leaves no residue when removing the first self-adhering sun shield removable sticker, the second self-adhering sun shield removable sticker, and the third self-adhering sun shield removable sticker from the windshield. Further, the first self-adhering sun shield removable sticker, the second self-adhering sun shield removable sticker, and the third self-adhering sun shield removable sticker are shaped and sized to provide coverage of the windshield which is not shielded from direct glare of sunlight by factory tinting of the windshield glass or by a first sun visor or a second sun visor.

The first self-adhering sun shield removable sticker, the second self-adhering sunshield removable sticker, and the third self-adhering sun shield removable sticker of the self-adhering sun shield assembly each further comprise a flat, durable protective backing sheet individually to protect the first self-adhering sun shield removable sticker, the second self-adhering sun shield removable sticker, and the third self-adhering sun shield removable sticker during storage.

The self-adhering sun shield assembly each further comprises at least one piece of cardboard for each self-adhering sun shield removable sticker, slightly larger in dimension than the first self-adhering sun shield removable sticker, the second self-adhering sun shield removable sticker, and the third self-adhering sun shield removable sticker and each cardboard for the first self-adhering sun shield removable sticker, the second self-adhering sun shield removable sticker, and the third self-adhering sun shield removable sticker adds structural integrity to prevent damage during storage and shipping. Each piece of cardboard can be trimmed into a desired shape to then use as a template to cut the first self-adhering sun shield removable sticker, the second self-adhering sun shield removable sticker, and the third self-adhering sun shield removable sticker to fit on said windshield of the vehicle.

The first self-adhering sun shield removable sticker is preferably rectangular in shape and is fixedly-coupled to a first upper corner next to the first sun visor on the windshield relative to a seat of a driver of the vehicle. The first self-adhering sun shield removable sticker is approximately 6-inches in height by approximately 8-inches in width for a larger vehicle such as a SUV. The third self-adhering sun shield removable sticker is rectangular in shape and is fixedly-coupled to a second upper corner next to the second sun visor on the windshield relative to a seat of a passenger of the vehicle. The third self-adhering sun shield removable sticker is approximately 6-inches in height by approximately 8-inches in width for a larger vehicle such as a SUV. The second self-adhering sun shield removable sticker is rectangular in shape and is fixedly-coupled to a central upper area on the windshield between the first sun visor and the second sun visor. The second self-adhering sun shield removable sticker is approximately 6-inches in height by approximately 14-inches in width for the larger vehicle such as a SUV.

A kit is also embodied herein for the self-adhering sun shield fixedly-coupleable to a windshield of a vehicle system comprising at least: an optional storage box a having first self-adhering sun shield removable sticker mounted onto flat, durable backing sheet, a second self-adhering sun shield removable sticker mounted onto flat, durable backing sheet, and a third self-adhering sun shield removable sticker mounted onto a flat, durable backing sheet in various colors, designs, and themes; a plurality of cardboard pieces per each of the first self-adhering sun shield removable sticker, the second self-adhering sun shield removable sticker, and the third self-adhering sun shield removable sticker; and a set of user-installation instructions.

A method of using a self-adhering sun shield fixedly-coupleable to a windshield of a vehicle system comprising the steps of: choosing a self-adhering a sun shield assembly in a user-preferred color and size to fit a windshield of vehicle; removing individual packages of a first self-adhering sun shield removable sticker, a second self-adhering sun shield removable sticker, and a third self-adhering sun shield removable sticker from a self-adhering sun shield assembly; removing a piece of cardboard from an envelope housing the first self-adhering sun shield removable sticker that is mounted on a flat, durable protective backing sheet; trimming cardboard to form a template for a user-preferred desired location on the windshield for the first self-adhering sun shield removable sticker to fit the windshield using the template; using the cardboard that is now the template from the first self-adhering sun shield removable sticker envelope to cut the first self-adhering sun shield removable sticker into a desired shape to fit desired location; wiping clean the first self-adhering removable sun shield sticker; fixedly-coupling the first self-adhering sun shield removable sticker to the windshield to block sun glare; removing a piece of cardboard from an envelope housing the second self-adhering sun shield removable sticker that is mounted on a flat, durable protective backing sheet; trimming cardboard to form a template for a user-preferred desired location on the windshield for the second self-adhering sun shield removable sticker to fit the windshield using the template; using the cardboard that is now the template from the second self-adhering sun shield removable sticker envelope to cut the second self-adhering sun shield removable sticker into a desired shape to fit desired location; wiping clean the second self-adhering removable sun shield sticker; fixedly-coupling the second self-adhering sun shield removable sticker to the windshield to block sun glare; removing a piece of cardboard from an envelope housing the third self-adhering sun shield removable sticker that is mounted on a flat, durable protective backing sheet; trimming the cardboard to form a template for a user-preferred desired location on the windshield for the third self-adhering sun shield removable sticker to fit the windshield using the template; using the cardboard that is now the template from the third self-adhering sun shield removable sticker envelope to cut the third self-adhering sun shield removable sticker into a desired shape to fit desired location; wiping clean the third self-adhering removable sun shield sticker; and fixedly-coupling the third self-adhering sun shield sticker to windshield to block sun glare.

The present invention holds significant improvements and serves as a self-adhering sun shield fixedly-coupleable to a windshield of a vehicle system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, self-adhering sun shield fixedly-coupleable to a windshield of a vehicle system (Sun Shade Systems), constructed and operative according to the teachings of the present invention.

The various embodiments of the present invention will hereinafter be described in conjunction with the appended drawings, wherein like designations denote like elements.

DETAILED DESCRIPTION

Figure 1:
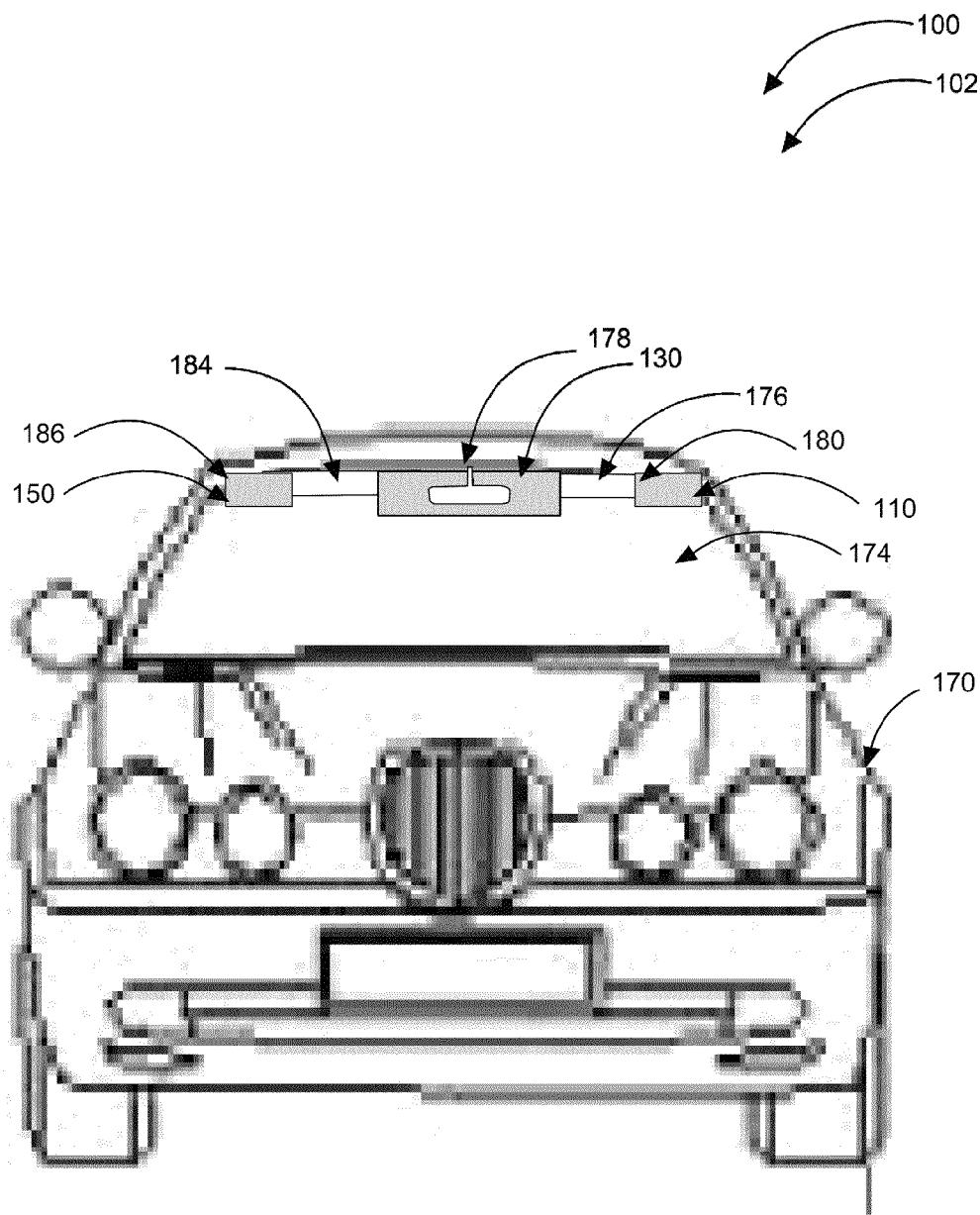
FIG. 1 shows a perspective view illustrating a self-adhering sun shield fixedly-coupleable to a windshield of a vehicle system in an in-use condition according to an embodiment of the present invention.

As discussed above, embodiments of the present invention relate to sun protection in vehicles and more specifically relates to a self-adhering sun shield fixedly-coupleable to a windshield of a vehicle system (Sun Shade Systems) that is specially designed to provide coverage of the upper top portion of windshield which is not shielded from direct sunlight by factory tinting of the windshield glass and glare prevented by a first sun visor or a second sun visor.

Generally speaking, the Sun Shade System (self-adhering sun shield fixedly-coupleable to a windshield of a vehicle system) comprises a novel product offering consumers a practical solution to the aforementioned challenges. As the name implies, the Sun Shade System comprises a specially designed set of three tinted windshield films, designed to adhere to auto glass through static cling, and be easily removable (the same principle that provides the adhesive properties of oil-change stickers and some parking passes), and shaped and sized to provide coverage to the upper top areas of the front windshield that are not shielded from direct sunlight by factory tinting of the front windshield glass or by the interior windshield visors. Tint color of film may vary to offer optimum sun shielding capabilities, or to match the vehicle's interior. As optional considerations, scenic mountain scapes, floral patterns, and other various designs may also be produced.

The Sun Shade System set preferably includes two smaller square or rectangular films for the upper corners of the front windshield, and one larger rectangular film for the central upper windshield area between and above the visors. (Alternate packages containing different quantities of tinted films may also be made available.) The two corner films would measure 6 inches in height by 6 to 8 inches in width; the larger center film would measure 6 inches in height by 14 inches in width. Film sizes may also vary and can be trimmed to provide a custom fit for any vehicle.

For example, larger sizes of the Sun Shade System will be offered and produced for larger vehicles such as motor homes, delivery trucks and vans, and the like. Each film will be mounted on a flat, durable backing against which the film will be pressed for storage; and also within each package will be a thin piece of cardboard slightly bigger than the piece of film (or tinted film). The consumer may trim this cardboard into the desired shape and use as a template/guide to then cut the tinted film piece. The piece of cardboard will also aid in making the envelope-type package stronger for storing flat, handling and presentation.

Adhered to the front windshield glass by static cling, the Sun Shade System will not require any additional adhesive and no tools other than maybe a pair of scissors to form the cardboard template may be required. In addition, there is preferably no mess or marring of the glass. These press-on films will be easy to install, reposition as needed or removed. Also, because maintaining the "static cling" is preferably a simple matter of briskly rubbing either the windshield, or the films, with a common towel prior to application, the Sun Shade System films may last indefinitely. As another option, but subject to testing, the Sun Shade System may later be produced for use throughout the vehicle's passenger windows, offering sun protection for all passengers.

The Sun Shade System tinted windshield films may be easy to use; easily affordable; and tinted to block glare and reduce light intensity while maintaining optimal visibility. Designed to "fill in" the troublesome areas of the front upper top portion of windshield not protected by in-glass tinting or by the vehicle's sun visors, the Sun Shade system may be part of every vehicle's auxiliary safety equipment.

Figure 2:
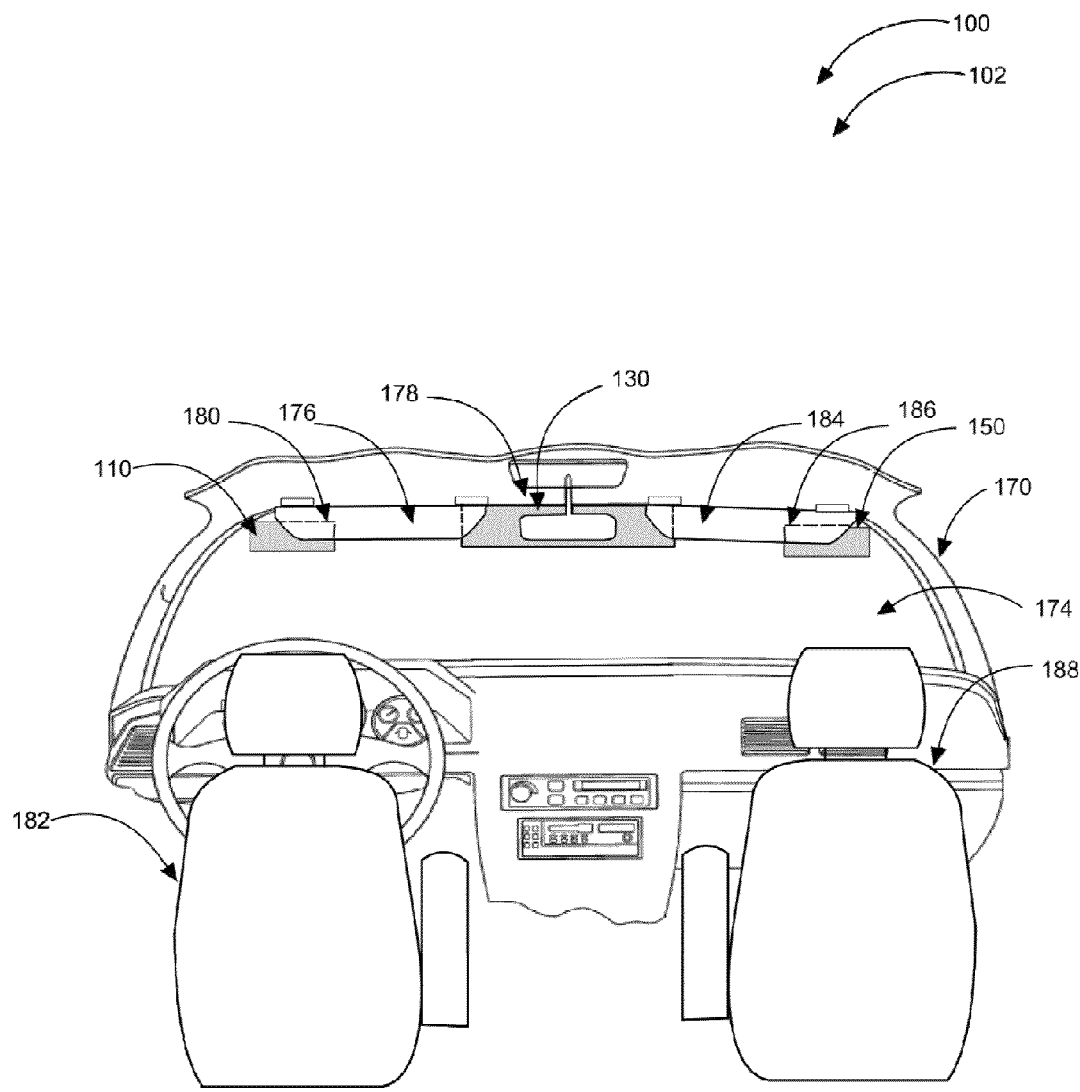
FIG. 2 is a perspective view illustrating a self-adhering sun shield assembly (rectangular-shaped first self-adhering sun shield removable sticker, rectangular-shaped second self-adhering sun shield removable sticker, and rectangular-shaped third self-adhering sun shield removable sticker) of the self-adhering sun shield fixedly-coupleable to a windshield of a vehicle system according to an embodiment of the present invention of FIG. 1.
Figure 3:
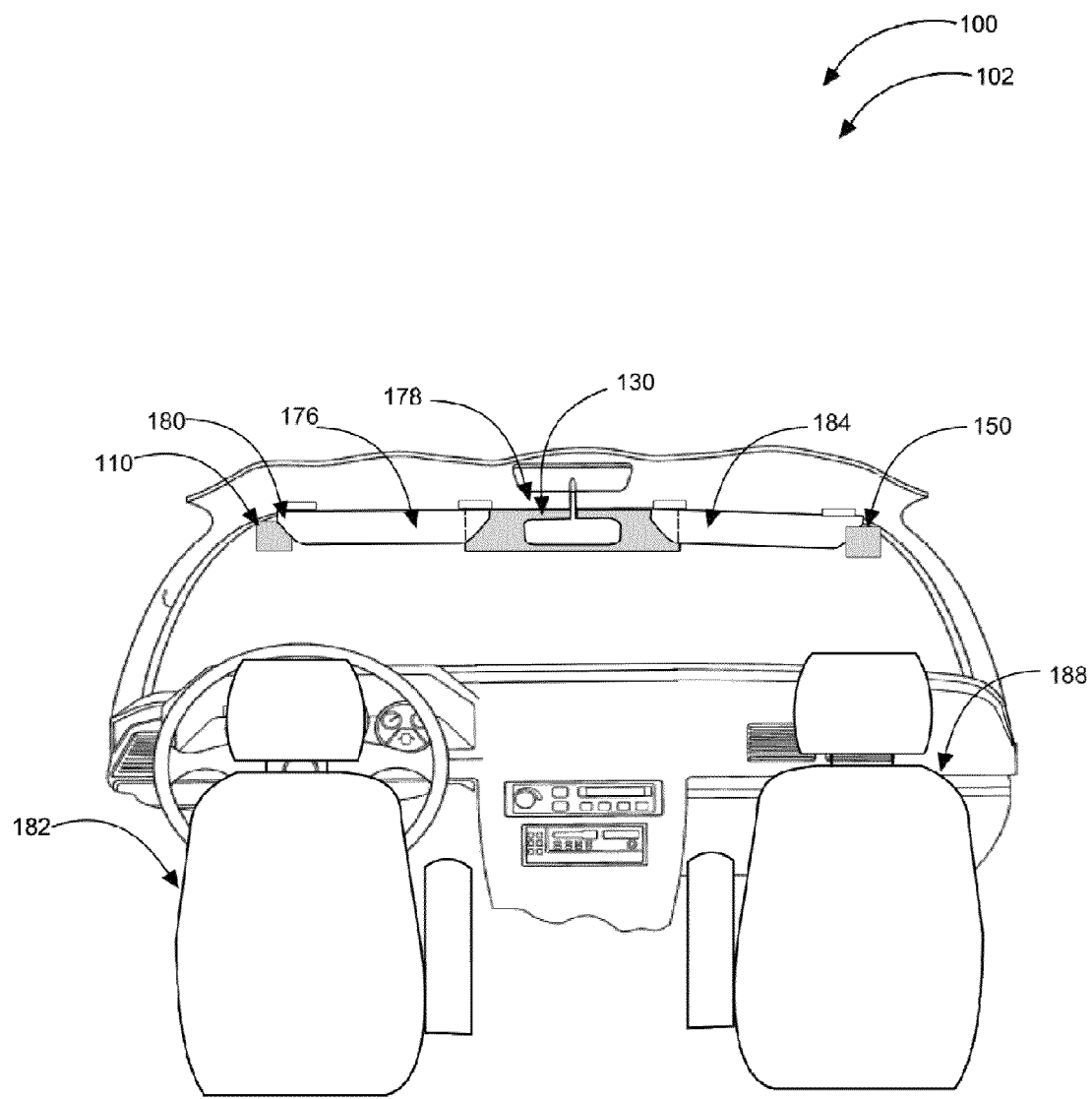
FIG. 3 is a perspective view illustrating the self-adhering sun shield assembly (square-shaped first self-adhering sun shield removable sticker, rectangular-shaped second self-adhering sun shield removable sticker, and square-shaped third self-adhering sun shield removable sticker) of the self-adhering sun shield fixedly-coupleable to a windshield of a vehicle system according to an embodiment of the present invention of FIG. 1.

Referring now to FIGS. 1-3, showing perspective views illustrating self-adhering sun shield assembly 102 of self-adhering sun shield fixedly-coupleable to a windshield of a vehicle system 100 according to an embodiment of the present invention of FIG. 1.

Self-adhering sun shield fixedly-coupleable to a windshield of a vehicle system 100 comprises: self-adhering sun shield assembly 102 having first self-adhering sun shield removable sticker 110, second self-adhering sun shield removable sticker 130; and third self-adhering sun shield removable sticker 150. Self-adhering sun shield fixedly-coupleable to a windshield of a vehicle system 100 comprises self-adhering sun shield assembly 102. Self-adhering sun shield assembly 102 is self-adhering to windshield 174 via static electricity. First self-adhering sun shield removable sticker 110, second self-adhering sun shield removable sticker 130, and third self-adhering sun shield removable sticker 150 form self-adhering sun shield assembly 102 when removably-adhered to windshield 174 to prevent sun glare when in in-use condition 106 as shown in FIG. 1.

First self-adhering sun shield removable sticker 110, second self-adhering sun shield removable sticker 130, and third self-adhering sun shield removable sticker 150 are tinted and opaque to reduce light intensity when passing through self-adhering sun shield assembly 102 while helping maintain sufficient optimal visibility through the rest of windshield 174 because of reduced glare brought on by the installation of sun shield assembly 102. First self-adhering sun shield removable sticker 110, second self-adhering sun shield removable sticker 130, and third self-adhering sun shield removable sticker 150 comprise a thin, lightweight film and are semi-transparent to permit unobstructed viewing through windshield 174 of vehicle 170. The lightweight film comprises vinyl and leaves no residue when removing first self-adhering sun shield removable sticker 110, second self-adhering sun shield removable sticker 130, and third self-adhering sun shield removable sticker 150 from windshield 174. Further, first self-adhering sun shield removable sticker 110, second self-adhering sun shield removable sticker 130, and third self-adhering sun shield removable sticker 150 are shaped and sized to provide coverage of windshield 174 which is not shielded from direct sunlight by factory tinting of the windshield glass and glare prevented by first sun visor 176 or second sun visor 184.

First self-adhering sun shield removable sticker 110, second self-adhering sun shield removable sticker 130, and third self-adhering sun shield removable sticker 150 of self-adhering sun shield assembly 102 each further comprise non-stick protective backing sheet 410 (as shown in kit 400 in FIG. 4) individually to protect first self-adhering sun shield removable sticker 110, second self-adhering sun shield removable sticker 130, and third self-adhering sun shield removable sticker 150 during storage.

Figure 4:
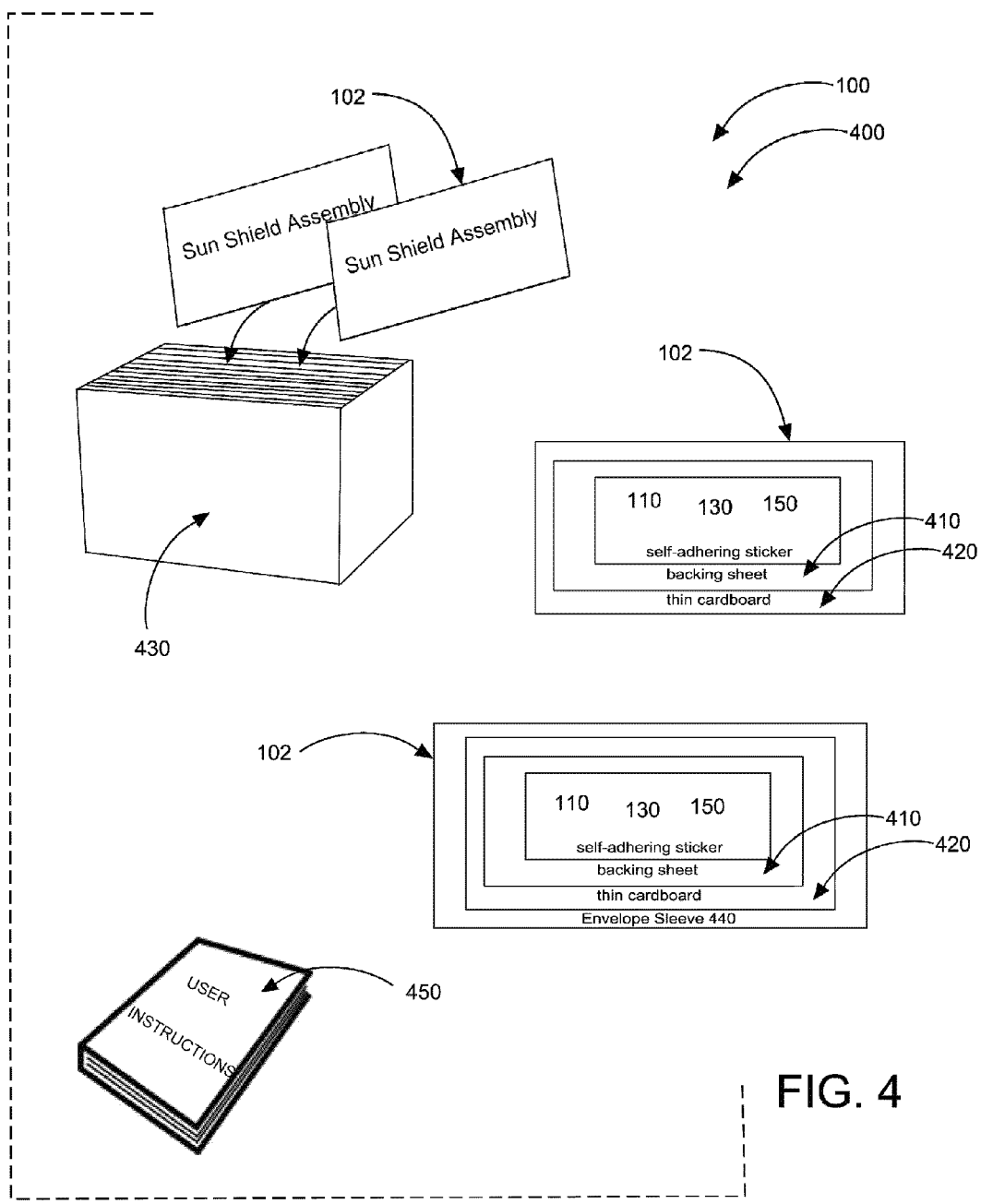
FIG. 4 is a perspective view illustrating a kit of the self-adhering sun shield fixedly-coupleable to a windshield of a vehicle system according to an embodiment of the present invention of FIG. 1.

Self-adhering sun shield assembly 102 each further comprises at least one piece of cardboard 420 slightly larger in dimension than first self-adhering sun shield removable sticker 110, second self-adhering sun shield removable sticker 130, and third self-adhering sun shield removable sticker 150 each first self-adhering sun shield removable sticker 110, second self-adhering sun shield removable sticker 130, and third self-adhering sun shield removable sticker 150 to add structural integrity to prevent damage during packaging, storage, and shipping (also shown in kit 400 in FIG. 4). At least one piece of cardboard 420 can be trimmed into a desired shape for use as a template to then cut first self-adhering sun shield removable sticker 110, second self-adhering sun shield removable sticker 130, and third self-adhering sun shield removable sticker 150 to fit on windshield 174 of vehicle 170.

First self-adhering sun shield removable sticker 110 may be square in shape and is fixedly-coupled to first upper corner 180 next to first sun visor 176 on windshield 174 relative to seat of a driver 182 of vehicle 170 as shown in FIG. 3. First self-adhering sun shield removable sticker 110 is preferably approximately 6-inches in height by approximately 6-inches in width for a smaller vehicle 170 such as a car. First self-adhering sun shield removable sticker 110 may also be rectangular in shape and is fixedly-coupled to first upper corner 180 next to first sun visor 176 on windshield 174 relative to seat of a driver 182 of vehicle 170 as shown in FIG. 2. First self-adhering sun shield removable sticker 110 is approximately 6-inches in height by approximately 8-inches in width for larger vehicle 170 such as a SUV.

Third self-adhering sun shield removable sticker 150 may be square in shape and is fixedly-coupled to second upper corner 186 next to second sun visor 184 on windshield 174 relative to seat of a passenger 188 of vehicle 170 as shown in FIG. 3. Third self-adhering sun shield removable sticker 150 is preferably approximately 6-inches in height by approximately 6-inches in width for a smaller vehicle 170 such as a car. Third self-adhering sun shield removable sticker 150 may also be rectangular in shape and is fixedly-coupled to second upper corner 186 next to second sun visor 184 on windshield 174 relative to seat of a passenger 188 of vehicle 170 as shown in FIG. 2. Third self-adhering sun shield removable sticker 150 is preferably approximately 6-inches in height by approximately 8-inches in width for larger vehicle 170 such as a SUV.

Second self-adhering sun shield removable sticker 130 is preferably rectangular in shape and is fixedly-coupled to central upper area 178 on windshield 174 between and above first sun visor 176 and second sun visor 184 as shown in both FIGS. 2 & 3. Second self-adhering sun shield removable sticker 130 is approximately 6-inches in height by approximately 14-inches in width for larger vehicle 170 such as a SUV.

Referring now to FIG. 4 is a perspective view illustrating kit 400 of self-adhering sun shield fixedly-coupleable to a windshield of a vehicle system is 100 according to an embodiment of the present invention of FIG. 1

Self-adhering sun shield fixedly-coupleable to a windshield of a vehicle system 100 may be sold as kit 400 comprising at least the following parts: optional storage box 430 having first self-adhering sun shield removable sticker 110 mounted onto flat, durable backing sheet 410, second self-adhering sun shield removable sticker 130 mounted onto flat, durable backing sheet 410, and third self-adhering sun shield removable sticker 150 mounted onto flat, durable backing sheet 410 in various colors, designs, and themes; a plurality of cardboard pieces 420 per each of first self-adhering sun shield removable sticker 110, second self-adhering sun shield removable sticker 130, and third self-adhering sun shield removable sticker 150, and set of user-installation instructions 450. It should be noted that self-adhering sun shield fixedly-coupleable to a windshield of a vehicle system 100 may include an envelope-type sleeve 440 (cellophane package) for storing each set of first self-adhering sun shield removable sticker 110, second self-adhering sun shield removable sticker 130, and third self-adhering sun shield removable sticker 150 to be used for the storage and shipping purposes. Self-adhering sun shield fixedly-coupleable to a windshield of a vehicle system is 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color/design/tint combinations, parts may be sold separately, etc., may be sufficient.

Figure 5:
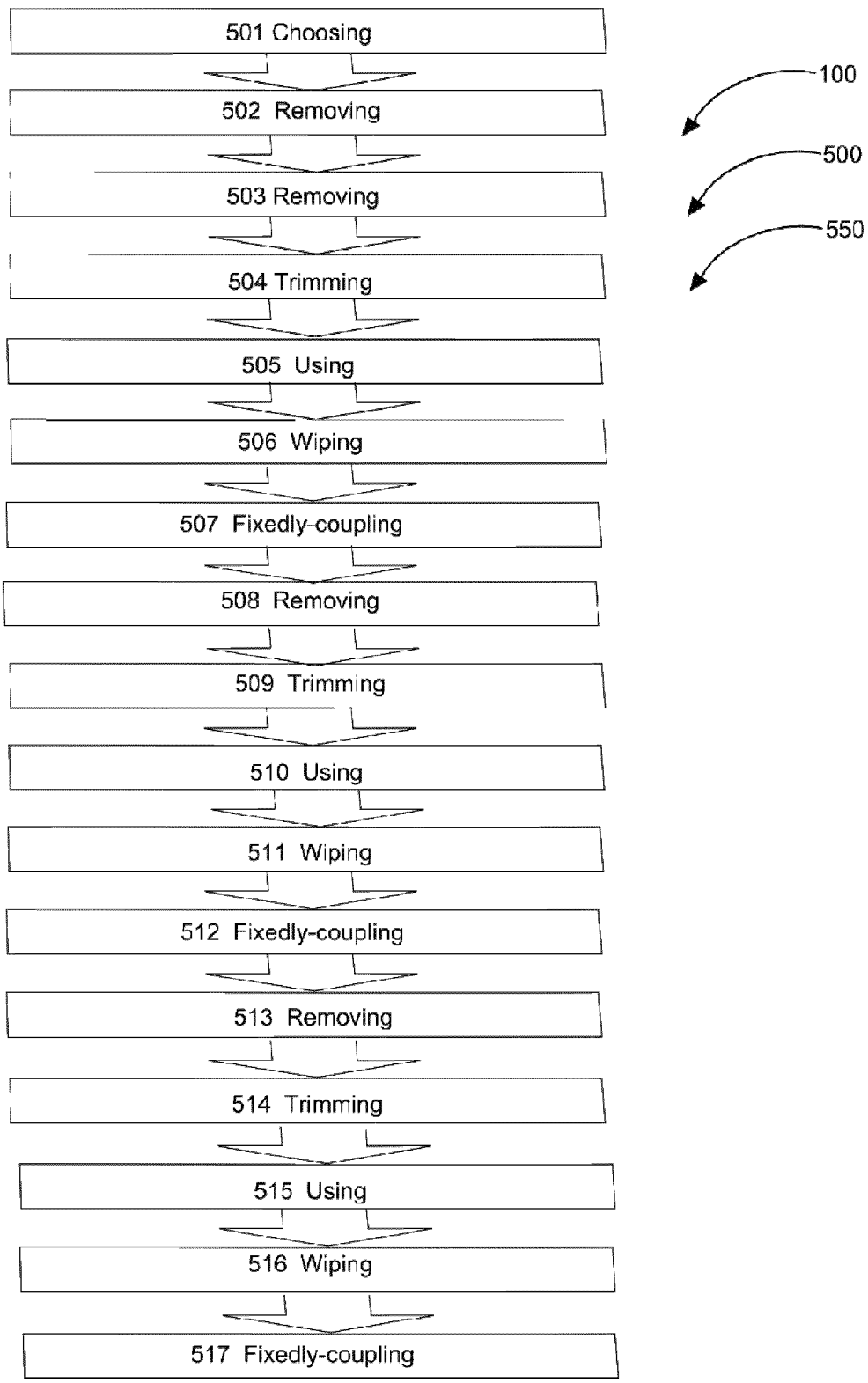
FIG. 5 is a flowchart illustrating a method of use for the self-adhering sun shield fixedly-coupleable to a windshield of a vehicle system according to an embodiment of the present invention of FIGS. 1-4.

Referring now to FIG. 5, flowchart 550 illustrating method of use 500 for self-adhering sun shield fixedly-coupleable to a windshield of a vehicle system is 100 according to an embodiment of the present invention of FIGS. 1-4.

Method of use 500 of self-adhering sun shield fixedly-coupleable to a vehicle system 100 preferably comprises the steps of: step one 501 choosing self-adhering sun shield assembly 102 in a user-preferred color and size to fit windshield 174 of vehicle 170; step two 502 removing individual packages (envelope sleeve 440) of first self-adhering sun shield removable sticker 110, second self-adhering sun shield removable sticker 130, and third self-adhering sun shield removable sticker 150 from (self-adhering sun shield assembly 102) kit 400; step three 503 removing piece of cardboard 420 from the envelope housing first self-adhering sun shield removable sticker 110 that is mounted on flat, durable protective backing sheet 410; step four 504 trimming cardboard to form a template for a user-preferred desired location on windshield 174 for first self-adhering sun shield removable sticker 110 to fit windshield 174 using the template; step five 505 using the cardboard that is now the template from first self-adhering sun shield removable sticker 110 envelope to now cut first self-adhering sun shield removable sticker 110 into a desired shape to fit desired location; step six 506 wiping clean first self-adhering removable sun shield sticker 110; step seven 507 fixedly-coupling first self-adhering sun shield removable sticker 110 to windshield 174 to block sun glare; step eight 508 removing piece of cardboard 420 from the envelope housing second self-adhering sun shield removable sticker 130 that is mounted on flat, durable protective backing sheet 410; step nine 509 trimming cardboard to form a template for a user-preferred desired location on windshield 174 for second self-adhering sun shield removable sticker 130 to fit windshield 174 using the template; step ten 510 using the cardboard that is now the template from the second self-adhering sun shield removable sticker 130 envelope to now cut second self-adhering sun shield removable sticker 130 into a desired shape to fit desired location; step eleven 511 wiping clean second self-adhering removable sun shield sticker 130; step twelve 512 fixedly-coupling second self-adhering sun shield removable sticker 130 to windshield 174 to block sun glare; step thirteen 513 removing piece of cardboard 420 from the envelope housing third self-adhering sun shield removable sticker 150 that is mounted on flat, durable protective backing sheet 410; step fourteen 514 trimming cardboard to form a template for a user-preferred desired location on windshield 174 for third self-adhering sun shield removable sticker 150 to fit windshield 174 using the template; step fifteen 515 using the cardboard that is now the template from third self-adhering sun shield removable sticker 150 envelope to now cut third self-adhering sun shield removable sticker 150 into a desired shape to fit desired location; step sixteen 516 wiping clean third self-adhering removable sun shield sticker 150; and step seventeen 517 fixedly-coupling third self-adhering sun shield sticker 150 to windshield 174 to block sun glare.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A self-adhering sun shield fixedly-coupleable to a windshield of a vehicle system comprising:
    a self-adhering sun shield assembly having;
        a first self-adhering sun shield removable sticker;
            wherein said first self-adhering sun shield removable sticker includes an integral flat, durable protective backing sheet, said second self-adhering sun shield removable sticker further comprises an integral flat, durable protective backing sheet, and said third self-adhering sun shield removable sticker further comprises an integral flat, durable protective backing sheet individually to protect said first self-adhering sun shield removable sticker, said second self-adhering sun shield removable sticker, and said third self-adhering sun shield removable sticker during storage;
        a second self-adhering sun shield removable sticker; and
        a third self-adhering sun shield removable sticker; and
        at least one piece of cardboard slightly larger in dimension for each said first self-adhering sun shield removable sticker, said second self-adhering sun shield removable sticker, and said third self-adhering sun shield removable sticker each said first self-adhering sun shield removable sticker, said second self-adhering sun shield removable sticker, and said third self-adhering sun shield removable sticker to add structural integrity to prevent damage during packaging, storage, and shipping;
    wherein said self-adhering sun shield fixedly-coupleable to a windshield of a vehicle system comprises said self-adhering sun shield assembly;
    wherein said first self-adhering sun shield removable sticker, said second self-adhering sun shield removable sticker, and said third self-adhering sun shield removable sticker form self-adhering sun shield assembly when fixedly-adhered to said windshield to prevent sun glare when in an in-use condition;
    wherein said first self-adhering sun shield removable sticker, said second self-adhering sun shield removable sticker, and said third self-adhering sun shield removable sticker are tinted and opaque to reduce light intensity when passing through said self-adhering sun shield assembly yet maintaining sufficient optimal visibility; and
    wherein said first self-adhering sun shield removable sticker, said second self-adhering sun shield removable sticker, and said third self-adhering sun shield removable sticker are shaped and sized to provide coverage in upper top portion of said windshield which is not shielded from direct sunlight by factory tinting of the said windshield glass and glare prevented by a first sun visor or a second sun visor.

2. The self-adhering sun shield fixedly-coupleable to a windshield of a vehicle system of claim 1 wherein said self-adhering sun shield assembly is self-adhering to said windshield via static electricity.

3. The self-adhering sun shield fixedly-coupleable to a windshield of a vehicle system of claim 2 wherein said first self-adhering sun shield removable sticker, said second self-adhering sun shield removable sticker, and said third self-adhering sun shield removable sticker comprise a thin, lightweight film and are semi-transparent to permit unobstructed viewing through said windshield.

4. The self-adhering sun shield fixedly-coupleable to a windshield of a vehicle system of claim 3 wherein said lightweight film comprises vinyl and leaves no residue when removing first self-adhering sun shield removable sticker, said second self-adhering sun shield removable sticker, and said third self-adhering sun shield removable sticker from said windshield.

5. The self-adhering sun shield fixedly-coupleable to a windshield of a vehicle system of claim 1 wherein said first self-adhering sun shield removable sticker is square in shape and is removably-coupled to a first upper corner next to said first sun visor on said windshield relative to a seat of a driver of said vehicle.

6. The self-adhering sun shield fixedly-coupleable to a windshield of a vehicle system of claim 5 wherein said first self-adhering sun shield removable sticker is approximately 6-inches in height by approximately 6-inches in width for a smaller said vehicle such as a car.

7. The self-adhering sun shield fixedly-coupleable to a windshield of a vehicle system of claim 1 wherein said first self-adhering sun shield removable sticker is rectangular in shape and is removably-coupled to a first upper corner next to said first sun visor on said windshield relative to a seat of a driver of said vehicle.

8. The self-adhering sun shield fixedly-coupleable to a windshield of a vehicle system of claim 7 wherein said first self-adhering sun shield removable sticker is approximately 6-inches in height by approximately 8-inches in width for larger said vehicle such as a SUV.

9. The self-adhering sun shield fixedly-coupleable to a windshield of a vehicle system of claim 1 wherein said third self-adhering sun shield removable sticker is square in shape and is removably-coupled to a second upper corner next to said second sun visor on said windshield relative to a seat of a passenger of said vehicle.

10. The self-adhering sun shield fixedly-coupleable to a windshield of a vehicle system of claim 9 wherein said third self-adhering sun shield removable sticker is approximately 6-inches in height by approximately 6-inches in width for a smaller said vehicle such as a car.

11. The self-adhering sun shield fixedly-coupleable to a windshield of a vehicle system of claim 1 wherein said third self-adhering sun shield removable sticker is rectangular in shape and is removably-coupled to a second upper corner next to said second sun visor on said windshield relative to a seat of a passenger of said vehicle.

12. The self-adhering sun shield fixedly-coupleable to a windshield of a vehicle system of claim 11 wherein said third self-adhering sun shield removable sticker is approximately 6-inches in height by approximately 8-inches in width for larger said vehicle such as a SUV.

13. The self-adhering sun shield fixedly-coupleable to a windshield of a vehicle system of claim 1 wherein said second self-adhering sun shield removable sticker is rectangular in shape and is removably-coupled to a central upper area on said windshield between said first sun visor and said second sun visor.

14. The self-adhering sun shield fixedly-coupleable to a windshield of a vehicle system of claim 13 wherein said second self-adhering sun shield removable sticker is approximately 6-inches in height by approximately 14-inches in width for larger said vehicle such as a SUV.

15. The self-adhering sun shield fixedly-coupleable to a windshield of a vehicle system of claim 1 wherein said piece of cardboard can be trimmed into a desired shape for use as a template to then cut said first self-adhering sun shield removable sticker, said second self-adhering sun shield removable sticker, and said third self-adhering sun shield removable sticker to fit on said windshield of said vehicle.

16. A self-adhering sun shield fixedly-coupleable to a windshield of a vehicle system comprising:
   a self-adhering sun shield assembly having;
      a first self-adhering sun shield removable sticker;
      a second self-adhering sun shield removable sticker; and
      a third self-adhering sun shield removable sticker;
   wherein said self-adhering sun shield fixedly-coupleable to a windshield of a vehicle system comprises said self-adhering sun shield assembly;
   wherein said self-adhering sun shield assembly is self-adhering to said windshield via static electricity;
   wherein said first self-adhering sun shield removable sticker, said second self-adhering sun shield removable sticker, and said third self-adhering sun shield removable sticker form self-adhering sun shield assembly when fixedly-adhered to said windshield to prevent sun glare when in an in-use condition;
   wherein said first self-adhering sun shield removable sticker, said second self-adhering sun shield removable sticker, and said third self-adhering sun shield removable sticker are tinted and opaque to reduce light intensity when passing through said self-adhering sun shield assembly yet maintaining sufficient optimal visibility through said windshield due to reduced glare brought on by installation of said sunshield assembly;
   wherein said first self-adhering sun shield removable sticker, said second self-adhering sun shield removable sticker, and said third self-adhering sun shield removable sticker comprise a thin, lightweight film and are semi-transparent to permit unobstructed viewing through said windshield;
   wherein said lightweight film comprises vinyl and leaves no residue when removing first self-adhering sun shield removable sticker, said second self-adhering sun shield removable sticker, and said third self-adhering sun shield removable sticker from said windshield;
   wherein said first self-adhering sun shield removable sticker, said second self-adhering sun shield removable sticker, and said third self-adhering sun shield removable sticker are shaped and sized to provide coverage of upper top portion of said windshield which is not shielded from direct sunlight by factory tinting of the said windshield glass and glare prevented by a first sun visor or a second sun visor;
   where said first self-adhering sun shield removable sticker further comprises an integral flat, durable protective backing sheet, said second self-adhering sun shield removable sticker further comprises an integral flat, durable protective backing sheet, and said third self-adhering sun shield removable sticker further comprises an integral flat, durable protective backing sheet individually to protect said first self-adhering sun shield removable sticker, said second self-adhering sun shield removable sticker, and said third self-adhering sun shield removable sticker during storage;
   where said self-adhering sun shield assembly each further comprises at least one piece of cardboard slightly larger in dimension for each said first self-adhering sun shield removable sticker, said second self-adhering sun shield removable sticker, and said third self-adhering sun shield removable sticker each said first self-adhering sun shield sticker, said second self-adhering sun shield removable sticker, and said third self-adhering sun shield removable sticker to add structural integrity to prevent damage during packaging, storage, and shipping;
   wherein said piece of cardboard can be trimmed into a desired shape for use as a template to then cut said first self-adhering sun shield removable sticker, said second self-adhering sun shield removable sticker, and said third self-adhering sun shield removable sticker to fit on said windshield of said vehicle;
   wherein said first self-adhering sun shield removable sticker is rectangular in shape and is removably-coupled to a first upper corner next to said first sun visor on said windshield relative to a seat of a driver of said vehicle;
   wherein said first self-adhering sun shield removable sticker is approximately 6-inches in height by approximately 8-inches in width for larger said vehicle such as a SUV;
   wherein said third self-adhering sun shield removable sticker is rectangular in shape and is removably-coupled to a second upper corner next to said second sun visor on said windshield relative to a seat of a passenger of said vehicle;
   wherein said third self-adhering sun shield removable sticker is approximately 6-inches in height by approximately 8-inches in width for larger said vehicle such as a SUV;
   wherein said second self-adhering sun shield removable sticker is rectangular in shape and is removably-coupled to a central upper area on said windshield between said first sun visor and said second sun visor; and
   wherein said second self-adhering sun shield removable sticker is approximately 6-inches in height by approximately 14-inches in width for larger said vehicle such as a SUV.

17. The self-adhering sun shield fixedly-coupleable to a windshield of a vehicle system of claim 16 further comprising a kit including an optional storage box having said first self-adhering sun shield removable sticker mounted onto said flat, durable backing sheet, said second self-adhering sun shield removable sticker mounted onto said flat, durable backing sheet, and said third self-adhering sun shield removable sticker mounted onto said flat, durable backing sheet in various colors, designs, and themes; a plurality of cardboard pieces per each of said first self-adhering sun shield removable sticker, said second self-adhering sun shield removable sticker, and said third self-adhering sun shield removable sticker, and a set of user-installation instructions.

18. A method of using a self-adhering sun shield fixedly-coupleable to a windshield of a vehicle system comprising the steps of:

choosing self-adhering a sun shield assembly in a user-preferred color and size to fit a windshield of vehicle;

removing individual packages of a first self-adhering sun shield removable sticker, a second self-adhering sun shield removable sticker, and a third self-adhering sun shield removable sticker from a self-adhering sun shield assembly;

removing a piece of cardboard from an envelope housing said first self-adhering sun shield removable sticker that is mounted on a flat, durable protective backing sheet;

trimming cardboard to form a template for a user-preferred desired location on said windshield for said first self-adhering sun shield removable sticker to fit said windshield using the template;

using said cardboard that is now said template from said first self-adhering sun shield removable sticker envelope to cut said first self-adhering sun shield removable sticker into a desired shape to fit desired location;

wiping clean said first self-adhering removable sun shield sticker;

fixedly-coupling said first self-adhering sun shield removable sticker to said windshield to block sun glare;

removing a piece of cardboard from an envelope housing said second self-adhering sun shield removable sticker that is mounted on a flat, durable protective backing sheet;

trimming cardboard to form a template for a user-preferred desired location on said windshield for said second self-adhering sun shield removable sticker to fit said windshield using the template;

using said cardboard that is now said template from said second self-adhering sun shield removable sticker envelope to cut said second self-adhering sun shield removable sticker into a desired shape to fit desired location;

wiping clean said second self-adhering removable sun shield sticker;

fixedly-coupling said second self-adhering sun shield removable sticker to said windshield to block sun glare;

removing a piece of cardboard from an envelope housing said third self-adhering sun shield removable sticker that is mounted on a flat, durable protective backing sheet;

trimming said cardboard to form a template for a user-preferred desired location on said windshield for said third self-adhering sun shield removable sticker to fit said windshield using the template;

using said cardboard that is now the template from said third self-adhering sun shield removable sticker envelope to cut said third self-adhering sun shield removable sticker into a desired shape to fit desired location;

wiping clean said third self-adhering removable sun shield sticker; and fixedly-coupling said third self-adhering sun shield sticker to windshield to block sun glare.

\* \* \* \* \*